United States Patent [19]
Kobayashi

[11] Patent Number: 5,363,256
[45] Date of Patent: Nov. 8, 1994

[54] TAPE TENSION ADJUSTING DEVICE

[75] Inventor: Junji Kobayashi, Tokyo, Japan

[73] Assignee: Canon Kabushiki Kaisha, Tokyo, Japan

[21] Appl. No.: 802,212

[22] Filed: Dec. 4, 1991

[30] Foreign Application Priority Data

Dec. 6, 1990 [JP] Japan .................... 2-400569

[51] Int. Cl.$^5$ .................... G11B 5/027
[52] U.S. Cl. .................... 360/85
[58] Field of Search .................... 360/85, 95; 242/197–200

[56] References Cited

U.S. PATENT DOCUMENTS

5,031,056  7/1991  Okada .................... 360/85
5,159,506  10/1992  Eino .................... 360/95

Primary Examiner—A. J. Heinz
Attorney, Agent, or Firm—Fitzpatrick, Cella, Harper & Scinto

[57] ABSTRACT

A tape tension adjusting device includes a tension arm rotatable in accordance with a tape tension, a restricting member for restricting the rotation of the tension arm when the tape tension applied is more than a predetermined value and a pressing mechanism for pressing the tension arm against the restricting member when the tape is not running.

26 Claims, 5 Drawing Sheets

TAPE TENSION ADJUSTING DEVICE

BACKGROUND OF THE INVENTION

1. Field of the Invention

This invention relates to a tape tension adjusting device, and more particularly, to a device for adjusting the tension of a magnetic tape in a magnetic recording/reproducing apparatus, such as a video cassette recorder (VCR), a digital audio tape recorder (DAT) or the like.

2. Description of the Related Art

In a recording/reproducing apparatus using magnetic tape as a recording medium, such as VCR, a DAT or the like, a magnetic tape received within a tape cassette is drawn from the tape cassette, and a recording/reproducing operation is performed while pressing the magnetic tape against a recording/reproducing magnetic head, such as a rotating head or the like.

Figure 1:
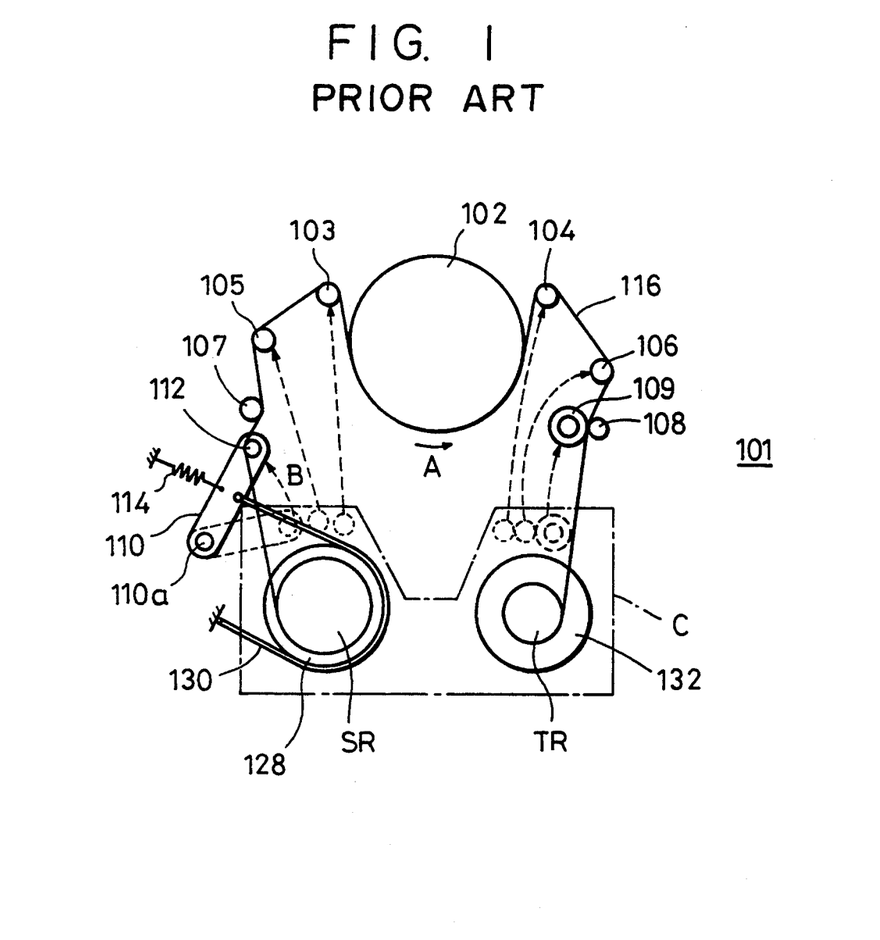
FIG. 1 is a diagram showing a tape loading mechanism of a helical scanning VCR.

FIG. 1 shows a tape loading mechanism of a so-called helical-scanning VCR wherein a tape is drawn from a cassette and is helically wound around a rotating head drum to perform a recording/reproducing operation.

In FIG. 1, there are shown a cassette C, a supply-side reel SR and a takeup-side reel TR.

There is also shown a main chassis 101. A rotating head drum 102 is rotatably mounted on the main chassis 101 in an inclined state at a predetermined angle, and is rotated at a high speed by a motor (not shown).

Movable tape guide posts 103-106 draw a tape 116 from the cassette C mounted on the main chassis 101, and wind it around the rotating head drum 102 to form a tape path shown in FIG. 1. The movable tape guide posts 103-106 are operated by a well-known mechanism (not shown). A fixed guide post 107 for forming the tape path is provided on the main chassis 101. A capstan 108 drives the tape 116. A pinch roller 109 presses the tape 116 against the capstan 108 to run the tape 116.

A supply-side reel mount 128 and a takeup-side reel mount 132 engage the supply-side reel SR and the takeup-side reel TR within the mounted cassette C to rotate the reels, respectively. These reel mounts 128 and 132 are rotatably driven by well-known means (not shown).

A tension regulator arm (hereinafter termed a tension arm) 110 maintains the tension of the tape 116 running along the tape path at a constant value to provide good contact of the tape 116 with head drum 102. The tension arm 110 is rotatably disposed on the main chassis 101 via a pin 110a provided at one end of the tension arm 110. A pin 112 contacting the tape 116 is provided at the other end of the tension arm 110. The tension arm 110 is biased in a direction to press the pin 112 against the tape 116 by the elasticity of spring 114, and is connected to one end of a belt 130 wound around the outer circumference of the supply-side reel mount 128.

When the tension arm 110 is biased in a counterclockwise direction direction by spring 114, the supply-side reel mount 128 is braked by surface contact with the belt 130. When the tension arm 110 rotates in a clockwise direction, the belt 130 is loosened to reduce braking action applied to the supply-side reel mount 128.

When the tape 116 runs in the state shown in FIG. 1, if back tension applied to the tape 116 is reduce due to a change in the amount of the tape 116 wound around the supply-side reel SR, the tension arm 110 is rotated in a counterclockwise direction by the spring 114 to tighten the belt 130 around reel mount 128. The back tension, i.e., the load in the tape running system, changes as the diameter of the tape 116 wound around the reel SR changes, thus changing the rotational moment in rotating reel SR. Hence, the supply-side reel mount 128 is braked to increase the back tension, and the original tension is restored.

When the back tension on the tape 116 increases, the tension arm 110 is rotated in a clockwise direction against the spring 114 to loosen the belt 130. Hence, the brake force applied against the supply-side reel mount 128 is lessened to reduce the back tension, and the original tension is recovered.

In order to perform a stable recording/reproducing operation, it is necessary to apply a predetermined tension to the tape 116. As described above, since the tension arm 110 detects a change in the tape tension and automatically corrects the tension, it is possible to always maintain the tape tension at a predetermined value.

According to the tape loading mechanism, in an unloading state wherein the tape 116 is received within the cassette C, the movable guide posts 103-106, the pinch roller 109 and the pin 112 of the tension arm 110 are situated inside the tape 116 within the cassette C, as indicated by broken lines in FIG. 1. When the tape loading mechanism operates, the movable guide posts 103-106, the pinch roller 109 and the pin 112 of the tension arm 110 draw the tape 116 from within the cassette C to provide a loading state wherein the tape path shown in FIG. 1 is formed.

The above-described tape loading mechanism, however, has the following problems.

That is, in a normal tape running state wherein the tape 116 runs in the direction of arrow A (the forward direction) shown in FIG. 1, the tape tension must be maintained constant. When the tape 116 is running, the tension arm 110 is free, and a change in the tape tension is detected to control the braking effect of the belt 130, as described above. The brake for the supply-side reel mount 128 is thereby controlled to maintain the tape tension constant.

When the tape 116 stops, the tape 116 must be loosened because the tape 116 may be damaged if an unnecessary tension is applied to the tape 116.

When the tape 116 runs in a direction reverse to the direction of arrow A (in a reversal playback operation or the like), since the capstan 108 is at a side downstream from the rotating head drum 102 in the forward running direction of the tape 116, the entire running system from the rotating head drum 102 to the takeup-side reel mount 132 becomes the rotation load, and the tape 116 is wound by the reel mount 128 which has previously been at the supply side. Accordingly, at the position of the tension arm 110, the tape 116 is pulled by the supply-side reel mount 128 to provide an excessive tension on the tape 116. As a result, the tension arm 110 is displaced by rotating in a clockwise direction against the spring 114, causing a change in the running position of the tape 116, whereby the tape 116 may be damaged by contacting the tape outlet in the cassette C.

Accordingly, the tension arm 110 must free the tape 116 when the tape 116 is running in the forward direction, restrict the tape 116 at a position where the tape 116 is loosened when the tape 116 stops, and restrict the movement of the tape 116 due to an excessive tension when the tape 116 is running in the reverse direction so that the running position of the tape 116 is not changed by the rotation of the tension arm 110 due to an increase in the tension.

In the above-described tape loading mechanism, however, the tension arm 110 is situated inside the tape 116 within the cassette C indicated by the broken lines in FIG. 1 in an unloading state, draws the tape 116 by rotating in the direction of arrow B in accordance with a tape loading operation, and is at the tape loading position shown in FIG. 1. Accordingly, it is impossible to provide means, such as a stopper or the like, for restricting the position of the tension arm 110 when the tape 116 stops or runs in the reverse direction, because such means obstructs the rotation of the tension arm 110.

Under such a background, in order to perform the position restriction in the above-described respective operational modes of the tension arm 110, there have been proposed configurations wherein the above-described stopper is separated from the rotational range of the tension arm 110 until the tape loading state is provided, and the tension arm 110 is moved to a position where it can be restricted after the tape loading operation has been completed.

Figure 2:
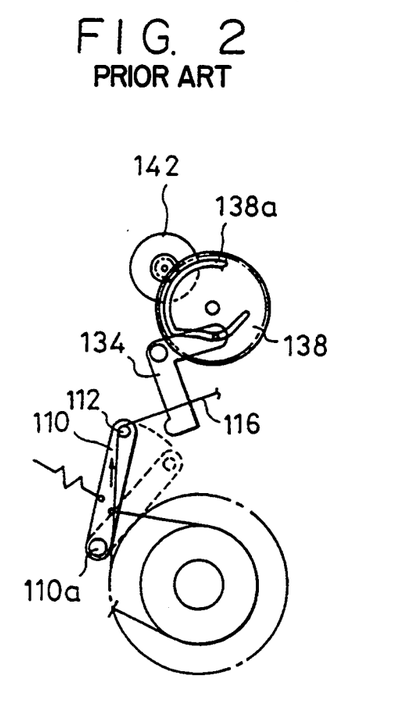
FIG. 2 is a diagram showing a tension arm restricting method using a movable member in the prior art, and represents a case wherein a tape is running in the forward direction.
Figure 3:
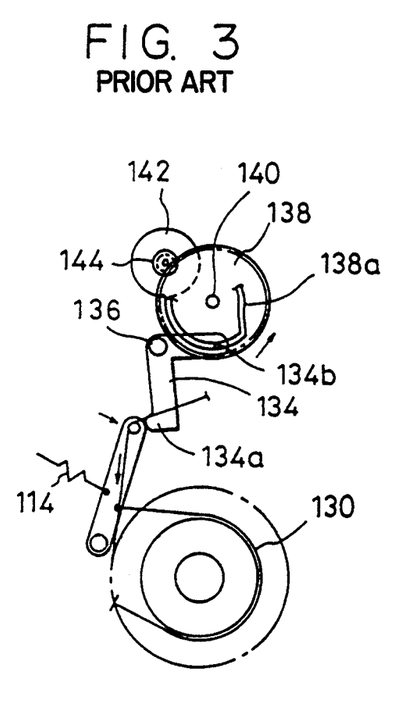
FIG. 3 represents a case wherein a tape is running in the reverse direction in the method shown in FIG. 2.

FIGS. 2 and 3 shown an example of such configurations. In FIGS. 2 and 3, the same components as shown in FIG. 1 are indicated by the same reference numerals.

In FIGS. 2 and 3, a stopper arm 134 is rotatably disposed on the main chassis 101 by a pin 136. A restricting member 134a for restricting the position of the tension arm 110 is formed at one end of the stopper arm 134. A cam follower pin 134a engaging a cam groove 138a formed on a gear board 138 (to be described later) is provided at the other end of the stopper arm 134.

The cam board 138 functions as a mode control means for setting various kinds of operational modes including the tape loading mechanism shown in FIG. 1 via a well-known drive transmission mechanism (not shown), and is rotatably disposed on the main chassis 101 via a pin 140. A gear portion formed on the outer circumference of the cam board 138 meshes with gear 144 mounted on the rotation shaft of a motor 142, whereby the cam board 138 is rotated by the rotation of the motor 142 at a reduced speed.

The cam groove 138a, whose distance from the pin 140 serving as the center of rotation changes in accordance with the rotational position, is formed on the cam board 138 so as to control the rotation of the stopper arm 134 by the rotation of the cam board 138 via the cam groove 138a.

The relationship between the cam groove 138a of the cam board 138 and the stopper arm 134 will now be explained. FIG. 2 shows a state in the course of tape loading shifting from an unloading state to a tape loading state. In this state, the cam follower pin 134b of the stopper arm 134 moves along a small-diameter portion of the cam groove 138a during the unloading state and the tape loading operation, whereby the stopper arm 134 is rotated in a counterclockwise direction and the restricting member 134a is maintained at a position out of the rotational range of the tension arm 110. Accordingly, the rotation of the tension arm 110 during the tape loading operation is not obstructed.

After the tape loading operation has been completed and the tension arm 110 has rotated to its operational position, the cam follower pin 134b of the stopper arm 134 moves from the small-diameter portion to a large-diameter portion of the cam groove 138a, as shown in FIG. 3, to rotate the stopper arm 134 in a clockwise direction. Hence, the restricting member 134a is moved to a position where the rotation of the tension arm 134 can be restricted. It is thereby possible to restrict the rotational position of the tension arm 110 if an excessive tension is applied during, for example, a playback operation of the tape in the reverse direction. p In the above-described method of restricting the tension arm using the movable members, however, positional accuracy is reduced due to a clearance between the respective members and the like, whereby, for example, the stability of the tape tension is reduced, and the tape is damaged by contacting the cassette because the running position of the tape is deviated, causing a problem from the viewpoint of reliability.

Furthermore, when the tape stops, the tension arm 110 is driven in a counterclockwise direction by the spring 114 to press its pin 112 against the tape. Hence, the tension continues to be applied to the tape, causing damage to the tape as described above.

In order to solve the above-described problems, a new stopper for restricting the tension arm 110 against the spring 114 is needed. Such a stopper must be separated from the tension arm 110 in its normal position because the stopper may obstruct the rotation of the tension arm 110 during the normal tape running state, and must be in close contact with the tension arm 110 only when the tape stops. In addition, the stopper cannot be provided within the rotational range of the tension arm 110.

However, it is almost impossible to provide a movable stopper mechanism for dealing with excessive tape tension to be used when the tape is not running at both sides of the tension arm 110, in consideration of limited space, complication of the configuration, and relationship with other mechanism. Accordingly, in the above-described tape loading mechanism, it is impossible to provide complete means for restricting the tension arm 110.

SUMMARY OF THE INVENTION

It is an object of the present invention to solve the above-described problems of the prior art.

It is another object of the present invention to provide a tape tension adjusting device which provide a high-precision fixed positioning means without obstructing the operation of a tension arm, and which can always highly precisely restrict a tape tension and a tape position.

It is still another object of the present invention to provide a tape tension adjusting device which restricts the position of a tension arm in a plurality of operational modes by pressing the tension arm against a common fixed member to improve positional accuracy, and which can restrict the tension arm by the common fixed member both when an excessive tension is applied and when the tension arm is forcedly fixed when the tape is not running.

These objects are accomplished, according to one aspect of the present invention, by a tape tension adjusting device, comprising an adjusting member in contact with a running tape, with the adjusting member including a pivoting pin for rotating in accordance with a tension applied by the tape. In addition, a restricting member restricts the rotation of the adjusting member when the tension applied by the tape is more than a predetermined value, and pressing means presses the adjusting member against the restricting member when the tape is not running.

According to another aspect of the present invention, the tape tension adjusting device comprises a rotatably mounted adjusting member in contact with the running tape, with the adjusting member rotating about one end in accordance with a tension applied by the tape. In addition, a stationary restricting member restricts rotation of the adjusting member when the tension applied by the tape is more than a predetermined value.

According to the above-described configuration, the tension arm, or adjusting member, is restricted by the restricting member even if a tension applied is more than the predetermined value, for example, while the tape is running in the reverse direction, whereby the tension arm is prevented from being rotated more than necessary. When the tape is not running, the tape can be in a non-tensioned state by pressing the tension arm against the restricting member by the pressing means. Since it is only necessary to increase the positional accuracy of the restricting member, the production and assembly of the device can be easily performed, whereby the production cost can be reduced.

The foregoing and other objects and features of the present invention will become apparent from the following detailed description of the preferred embodiment taken in connection with the accompanying drawings.

The foregoing and other objects and features of the present invention will become apparent from the following detailed description of the preferred embodiment taken in connection with the accompanying drawings.

DETAILED DESCRIPTION OF THE PREFERRED EMBODIMENT

A tape tension adjusting device according to the preferred embodiment of the present invention will now be explained in detail. First, an outline of the embodiment will be briefly described.

Recently, for the purpose of providing a small loading mechanism for a VCR, there have been developed tape loading mechanisms configured such that, after loading a cassette at a loading position on a main chassis, the cassette itself is further slid to the side of a rotating head drum in accordance with a tape loading operation to provide a tape loading state wherein part of the rotating head drum is received in a recess formed at a front surface of the tape-drawing side of the cassette.

In a device of this kin, a slide chassis which slides on the main chassis while mounting the cassette is disposed so as to be able to slide back and forth relative to the rotating head drum. A supply reel mounted, a takeup reel mount, a tension arm and the like are also disposed on the slide chassis.

Even in such a mechanism, the same approach as in the above-described prior art is adopted for the restriction of the tension arm in various kinds of operational modes, and so far no countermeasures have been provided. Accordingly, the above-described problems remain as problems which are inevitable for the tension arm.

The present embodiment relates to this mechanism. In the present embodiment, a fixed restricting member is provided at a position which is out of the rotational range of a tension arm in a tape unloading state wherein a slide chassis mounting a cassette is separated from a rotating head drum, and which is within the rotational range of the tension arm after the rotation of the tension arm to its operational position has been completed in a tape loading state wherein the slide chassis advances to the rotating head drum. The positional restriction of the tension arm in a plurality of operational modes is performed by pressing the tension arm against the fixed restricting member, thereby increasing positional accuracy. The tension arm can be restricted by the common fixed restricting member both when an excessive tension is applied and when the tension arm is forcively fixed in the case that the tape is not running.

That is, by utilizing the movement wherein the slide chassis provided with the tension arm slides in accordance with the tape loading operation, a configuration for restricting the position of the tension arm by forcedly pressing the tension arm against the fixed member is provided.

A detailed explanation will now be provided of a tape loading mechanism of a VCR in the tension adjusting device of the present embodiment with reference to the drawings.

Figure 4:
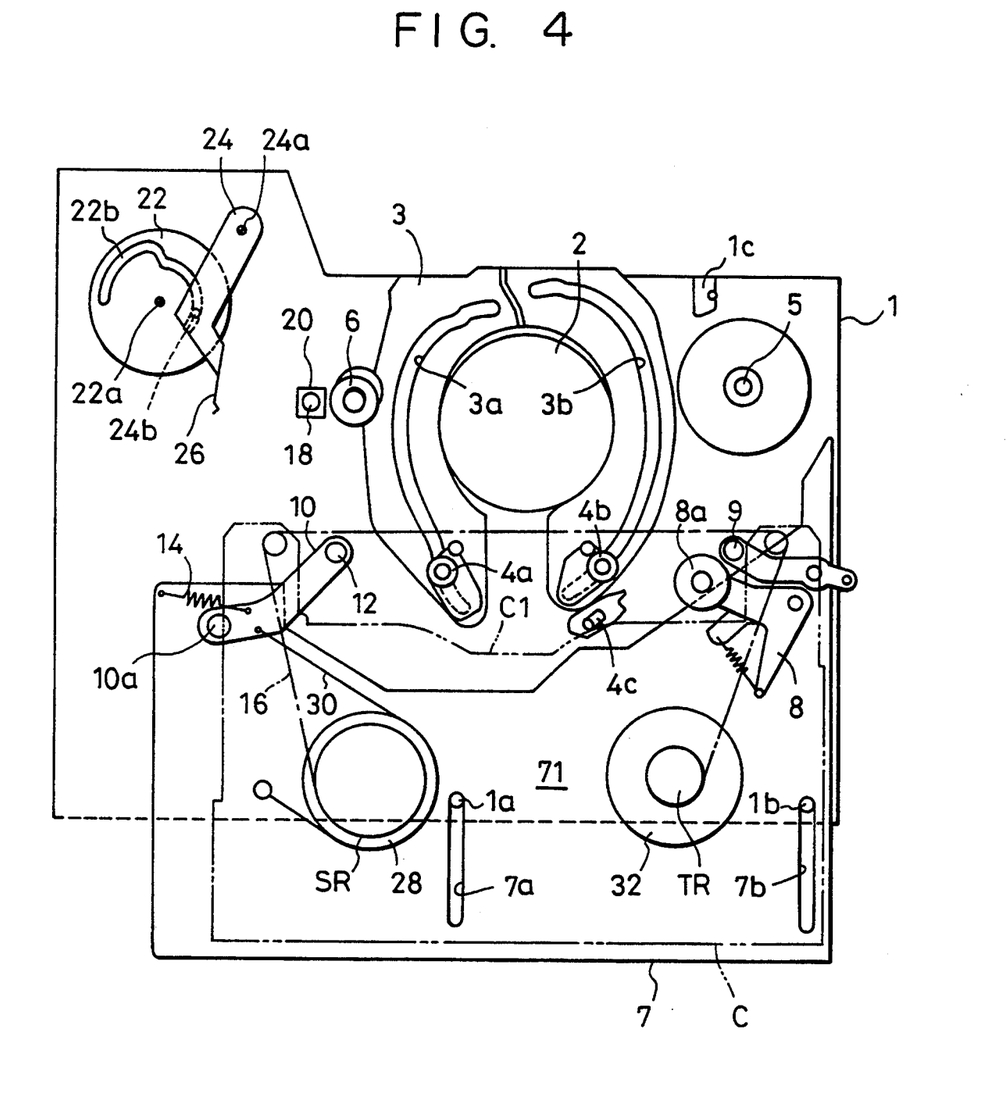
FIG. 4 is a diagram showing an embodiment of the present invention, and represents a tape unloading state.
Figure 5:
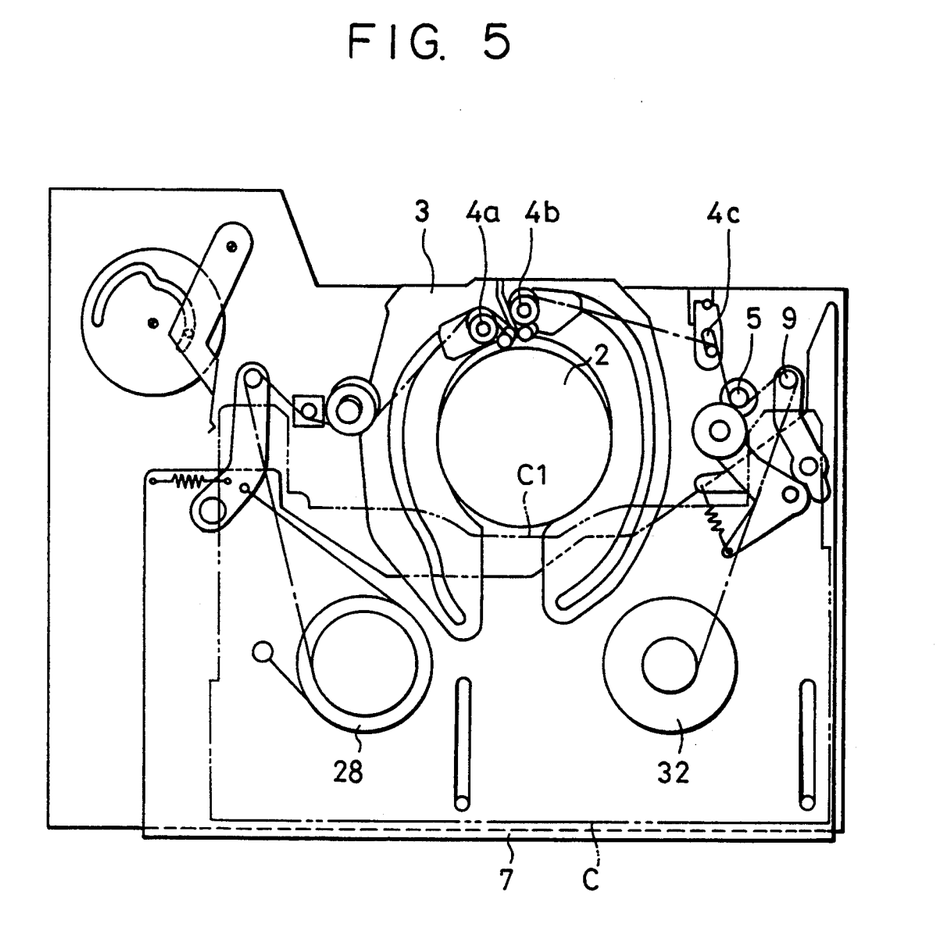
FIG. 5 represents a tape loading state in the embodiment shown in FIG. 4.

FIGS. 4 and 5 show a tape loading mechanism in a VCR. FIG. 4 represents a tape unloading state, and FIG. 5 represents a tape loading state.

In FIGS. 4 and 5, there is shown a main chassis 1. A rotating head drum 2 is rotatably mounted on the main chassis 1 in an inclined state at a predetermined angle via a drum base 3, and is configured so as to be rotated at a predetermined high speed by a drum motor (not shown).

A tape-entrance-side movable guide post 4a draws a tape from within a cassette C and winds the tape around the rotating head drum 2 at a predetermined angle from a tape-entrance side in a tape loading operation, and is moved along a guide groove 3a formed in the drum base 3 by a driving system (to be described later).

A tape-exit-side movable guide post 4b draws the tape from within the cassette C and winds the tape T around the rotating head drum 2 at the predetermined angel from a tape-exit side in a tape loading operation, and is moved along a guide groove 3b formed in the drum base 3 by a driving system (to be described later).

A capstan 5 is rotated by a motor (not shown) to move the tape. A movable inclined guide post 4c is operatively linked with the tape-exit-side movable guide post 4b by a driving system (to be described later) to draws the tape and guide the tape to the capstan 5 (in the position shown in FIG. 5). The operational position of the inclined guide post 4c is positioned by a positioning member 1c.

A fixed guide post 18, and a guide roller 6 which comprises an impedance roller are disposed in the main chassis 1. A positioning member 20 for positioning a tension arm (to be described later) is formed at a portion for mounting the fixed guide post 18 on the main chassis 1.

A movable chassis (hereinafter termed a slide chassis) 7 is disposed so as to be slidable back and forth relative to the rotating head drum 2 on the main chassis 1 by means of long holes 7a and 7b in the slide chassis 7 and pins 1a and 1b on the main chassis 1. A cassette mounting unit 71 is formed on the upper surface of the slide chassis 7. In the unloading state shown in FIG. 4, the slide chassis 7 retracts from the rotating head drum 2 so that the cassette C can be detached. In a state wherein any of various kinds of operational modes can be adopted after the completion of tape loading as shown in FIG. 5, the slide chassis 7 advances to the rotating head drum 2 so that part of the rotating head drum 2 is received within a recess C1 in the front surface of the cassette C, whereby the space is reduced, and it becomes possible to provide a small device.

A supply reel mount 28 and a takeup reel mount 32 are rotatably disposed on the slide chassis 7, engage a supply reel SR and a takeup reel TR of the mounted cassette C, respectively, and drive these reels in directions corresponding to the operational mode with a speed corresponding to the mode. These reel mounts are rotatably driven by a reel motor (not shown).

A tension arm 10 is rotatably disposed on the slide chassis 7 via a pin 10a, is driven in a counterclockwise direction by a spring 14, detects the tape tension by pressing the tape 16 drawn from the supply reel SR against a tension post 12, and maintains the tape tension constant by a controlling brake applied from a belt 30 wound around the circumference of the supply reel mount 28. The configuration and operation of this portion will be described in detail later.

A pinch roller lever 8 supports a pinch roller 8a pressed against the capstan 5 while receiving the tape 16 between the pinch roller 8a and the capstan 5 (see FIG. 5). A movable guide post 9 guides the tape 16 passing the capstan 5 to the takeup reel TR within the cassette C.

A cam board (named a mode cam) 22 for mode control is rotatably disposed on the main chassis 1 via a pin 22a. The cam board 22 is rotated by a motor (not shown) to run the tape loading operation and the tape unloading operation by operating the slide chassis 7, the respective movable guide posts 4a–4c and 9, the pinch roller lever 8 and the tension arm 10 via drive transmission mechanisms (not shown). The cam board 22 also sets various kinds of operational modes (for example, recording, playback, quick-feeding, rewinding, high-speed search, still playback, slow playback, reverse playback, stop and the like) in the tape loading state. A cam groove 22b comprising a large-diameter portion and a small-diameter portion with respect to the center of rotation for controlling the rotation of a tension arm restricting lever 24 (to be described later) is formed on the upper surface of the cam board 22.

One end of the tension arm restricting lever 24 is rotatably mounted on the main chassis 1 via a pin 24l. A leaf spring 26 for restricting the position of the tension arm 10 by pressing the tension arm 10 against the mounting base 20 of the fixed guide post 18 in accordance with an operational mode is mounted on the other end of the tension arm restricting lever 24. A cam follower pin 24b engaging the cam groove 22b in the upper surface of the cam board 22 for mode switching is formed on the lower surface of the tension arm restricting lever 24.

According to the above-described configuration, the tension arm restricting lever 24 is rotated by the cam groove 22b in accordance with the rotation of the cam board 22, and the position of the tension arm 10 is restricted in accordance with the operational mode of the tension arm restricting lever 24. The operation of the tension arm restricting lever 24 will be described in detail later.

The tape loading mechanism in the present embodiment has the above-described configuration. In the tape unloading state shown in FIG. 4, the slide chassis 7 is separated from the rotating head drum 2 so that the chassis C can be mounted on a cassette mounting unit 71 of the slide chassis 7.

When the cassette C is mounted on the slide chassis 7 in this state, the mounted state of the cassette C is detected by well-known means, and the advancing operation of the slide chassis 7 is started. In this state, all of the movable guide posts 4a, 4b, 4c and 9, and the pinch roller 8a are situated inside the tape 16 within the cassette C, the tension arm 10 is rotated in a clockwise direction against the spring 14, and the guide pin 12 for detecting tape tension provided at the distal end of the tension arm 10 is also received inside the tape 16 within the cassette C.

In the above-described state, the mounting base 20 of the fixed guide post 18 for restricting the position of the tension arm 10 is separated from the rotational range of the tension arm 10, and is in a positional relationship with the tension arm 10 so as not to obstruct the rotation of the tension arm 10 in a tape loading operation.

If the mounted state of the cassette C is detected in this state as described above, a loading motor (not shown) rotates to start the rotation of the cam board 22 for mode switching. The slide chassis 7 mounting the cassette C thereby starts to advance via a drive transmission mechanism (not shown), the movable guide posts 4a–4c and 9, the pinch roller 8a, and the pin 12 of the tension arm 10 start to move outside the cassette C, and a tape loading operation for drawing the tape from within the cassette C and loading the tape to the rotating head drum 2 and the capstan 5 is started. Thus, the tape path shown in FIG. 5 is formed to provide a tape loading state.

The cassette C on the slide chassis 7 is advanced to the rotating head drum 2, a state wherein part of the drum 2 is received within the recess C1 in the front surface of the cassette C is provided, and the tape loading state is thereby provided.

The important point is that the present embodiment is configured so that by the advancing sliding operation of the slide chassis 7, the mounting base 20 which is out of the rotational range of the tension arm 10 in the tape unloading state shown in FIG. 4 assumes a position within the rotational range of the tension arm 10 where the position of the tension arm 10 can be restricted, and the tension arm 10 is rotated to the position in the tape loading state shown in FIG. 5 by passing the tension arm 10 in front of the mounting base 20 before the mounting base 20 enters within the rotational range of the tension arm 10.

That is, in the tape loading state, as is apparent from FIG. 5, the mounting base 20 must be situated within the rotational range of the tension arm 10 because the mounting base 20 restricts movement of the tension arm 10. However, if the mounting base 20 is provided at such a position in a tape unloading state, the mounting base 20 obstructs the rotation of the tension arm 10, whereby it becomes impossible to perform a tape loading operation.

In the present embodiment, in a tape loading operation, the mounting base 20 formed on the main chassis 1 is situated outside the rotational range of the tension arm 10 until the tension arm 10 is rotated to the operational position in the tape loading state utilizing the sliding movement of the slide chassis 7, and the mounting base 20 is situated within the rotational range after the completion of the movement of the tension arm 10 to the operational position. Thus, the above-described problems are solved. In a tape unloading operation, since the tension arm 10 rotates into the chassis C and returns after the slide chassis 7 has restricted from the mounting base 20, the mounting base 20 of course does not obstruct the operation of the tension arm 10.

Figure 6:
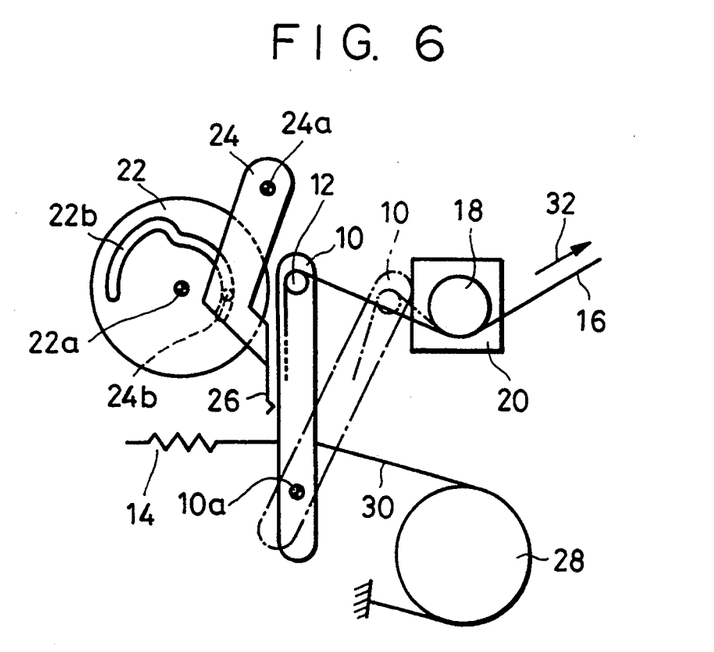
FIG. 6 is a plan view of a tape tension adjusting device when a tape is running according to the embodiment.
Figure 7:
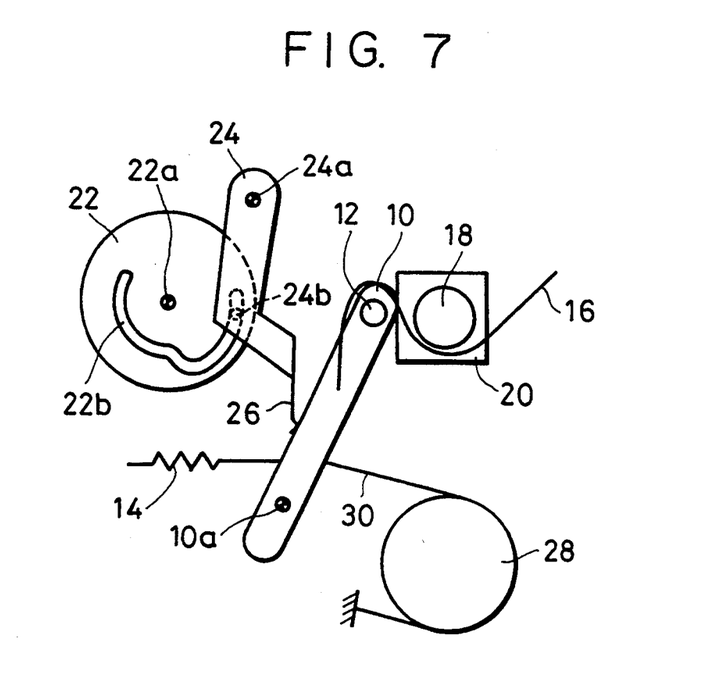
FIG. 7 is a plan view of the device when the tape stops.

An explanation will now be provided of the operations of the tension arm 10, and the mounting base 20 and the lever 24 for restricting the position of the tension arm 10 with reference to FIGS. 6 and 7.

In FIG. 6, as described above, the guide pin 12 is set on the distal end portion of the tension arm 10 rotatable around the pin 10a. The tension arm 10 is always biased in a counterclockwise direction by the spring 14. The tension arm 10 is at the position indicated by solid lines when the tape is running in the forward direction, and is at the position indicated by one-dot chain lines when the tape is running in the reverse direction. The magnetic tape 16 is drawn from the tape cassette. The guide post 18 guides the magnetic tape 16, and is fixed on the chassis 1 via the mounting base 20. The mounting base 20 is precisely positioned so as to restrict the rotation of the tension arm 10 in a clockwise direction due to the contact of the tension arm 10 with a side surface of the mounting base 20 when the tape is running in the reverse direction, as will be described in detail later.

The cam groove 22b is formed in the cam board 22 rotatable around the shaft 22a. The lever 24 is rotatable around the pin 24a. The pin 24b set on a side surface of the lever 24 enters the cam groove 22b of the cam board 22, whereby the lever 24 rotates around the pin 24a in accordance with the rotation of the cam board 22. The leaf spring 26 is mounted on the distal end portion of the lever 24. The lever 24 and the leaf spring 26 are provided in a position so as to release the tension arm 10 when the tape 16 is running, as shown in FIG. 6, and to force the tension arm 10 to contact the mounting base 20 when the tape is not running, as shown in FIG. 7.

The tension belt 30, one end of which is fixed on the main chassis 1, is fixed on the tension arm 12 while being wound around the reel mount 28.

In the above-described configuration, when the tape 16 runs in the forward direction (represented by arrow 32), the tape tension is weak because the resistance applied to the tape in contact with guide posts 4a–4c and 9, pinch roller 8a and capstan 5 occurs downstream from the tension arm 10 in the direction of the running tape. Thus, the tension arm 10 rotates in a counterclockwise direction and is positioned by the tension belt 30. In this case, the leaf spring does not bias the tension arm 10, which occupies the position indicated by the solid lines in FIG. 6. When the tape 16 runs in the reverse direction, the tape tension is high because the resistance applied to the tape in contact with guide posts 4a–4c and 9, pinch roller 8a and capstan 5 occurs upstream from the tension arm 10 in the direction of the running tape.

Thus, the tension arm 10 is rotated and driven in a clockwise direction, and stops at the position (the position indicated by the one-dot chain lines) of contacting the mounting base 20.

As shown in FIG. 7, when the tape is not running, the lever 24 rotates in a counterclockwise direction due to the rotation of the cam board 22, and the leaf spring 26 passes the tension arm 10 against the mounting base 20. The tape 16 is thereby loosened, assuming a non-tensional state.

In the present embodiment, when the tape is running in the reverse direction, the tension arm 10 is restricted by the mounting base 20 which is precisely positioned. Hence, accuracy in the restricting position of the guide pin 12 determining the path of the tape can be easily obtained. When the tape is not running, it is only necessary to press the tension arm 10 against the mounting base 20 by the leaf spring 26. Hence, high accuracy is not required for the components, and it is only necessary to use simple components.

Although, in the present embodiment, the mounting base 20 for the guide post 18 is used for restricting the rotation of the tension arm 10, any other member fixed to the main chassis 1, the guide post 18 itself or the main chassis 1 itself may of course by used in place of the mounting base 20. Furthermore, any other elastic member may be used in place of the leaf spring 26. In addition, the lever 24 may be driven by a solenoid.

As can be easily understood from the foregoing explanation, according to the present embodiment, it is possible to realize accuracy in the tape position using members having low precision, and therefore to largely reduce the production cost.

According to the tension adjusting device of the present embodiment, the position restriction of the tension arm in the plurality of operational modes is performed by pressing the tension arm against the common fixed member to improve positional accuracy, and the tension arm can be restricted by the common fixed member both when an excessive tension is applied and when the tension arm is forcively fixed when the tape is not running. Furthermore, it is possible to provide a high-precision fixed positioning means without obstructing the operation of the tension arm, and to precisely restrict tape tension and a tape position.

What is claimed is:

1. A tape tension adjusting device, comprising:
   an adjusting member in contact with a running tape, said adjusting member including a pivoting pin for rotating said adjusting member in accordance with a tension applied by the tape;
   a restricting member for restricting the rotation of said adjusting member when the tension applied by the tape is more than a predetermined value; and
   pressing means for pressing said adjusting member against said restricting member when the tape is stationary.

2. A device according to claim 1, wherein said pressing means presses said adjusting member against said restricting member to restrict its rotational movement.

3. A device according to claim 2, wherein said adjusting member extends in a linear direction and is provided with a guide member at a first end portion thereof and said pivoting pin is disposed at a second end thereof, wherein the tape is in rubbing contact with said guide member.

4. A device according to claim 3, wherein said first end portion of said adjusting member contacts said restricting member.

5. A device according to claim 1, wherein said pressing means comprises a cam and a lever in sliding engagement with said cam.

6. A device according to claim 5, further comprising pivoting means at a first end portion of said lever and a biasing member at a second end portion of said lever for pressing against said adjusting member.

7. A device according to claim 5, wherein said cam is a rotating member and includes a radial groove, and wherein a projection provided on said lever is engaged in said groove.

8. A recording/reproducing apparatus for performing recording/reproducing of signals on a tape, said apparatus comprising:
  a rotating drum head;
  tape winding means for winding the tape around said rotating head drum;
  an adjusting member in contact with the tape, said adjusting member including a pivoting pin for rotating said adjusting member in accordance with a tension applied by the tape;
  a restricting member for restricting the rotation of said adjusting member when the tension applied by the tape is more than a predetermined value; and
  pressing means for pressing said adjusting member against said restricting member when the tape is stationary.

9. An apparatus according to claim 8, wherein said pressing means presses said adjusting member against said restricting member to restrict its rotational movement.

10. An apparatus according to claim 9, wherein said adjusting member extends in a linear direction and is provided with a guide member at a first end portion thereof and said pivoting pin is disposed at a second end thereof. wherein the tape is in rubbing contact with said guide member.

11. An apparatus according to claim 10, wherein said first end portion of said adjusting member contacts said restricting member.

12. An apparatus according to claim 11, further comprising a chassis for supporting said recording/reproducing apparatus, wherein said restricting member is part of said chassis.

13. An apparatus according to claim 11, wherein said winding means includes a tape guiding member and said restricting member forms a base for supporting said tape guiding member.

14. An apparatus according to claim 13, wherein said base is fixed to said chassis.

15. An apparatus according to claim 8, wherein said pressing means comprises a cam and a lever in sliding engagement with said cam.

16. An apparatus according to claim 15, further comprising pivoting means at a first end portion of said lever and a biasing member at a second end portion of said lever for pressing against said adjusting member.

17. An apparatus according to claim 15, wherein said cam is a rotating member and includes a radial groove, and wherein a projection provided on said lever is engaged in said groove.

18. A recording/reproducing apparatus for performing recording/reproducing of signals on a tape-like recording medium, said apparatus comprising:
  a head drum including at least one head;
  a first chassis for mounting said head drum;
  a second chassis movably disposed relative to said first chassis and capable of mounting the medium thereon;
  a plurality of guiding members for guiding the recording medium to said head drum;
  an adjusting member, rotatably mounted on the second chassis, in contact with the tape, said adjusting member including a pivot point and rotating about the pivot point in accordance with a tension applied by the recording medium;
  a restricting member, provided on said first chassis, for restricting rotation of said adjusting member when the tension applied by the recording member is more than a predetermined value; and
  pressing means for pressing said adjusting member against said restricting member when the recording medium is stationary.

19. An apparatus according to claim 18, wherein said pressing means presses said adjusting member against said restricting member to restrict its rotational movement.

20. An apparatus according to claim 19, wherein said adjusting member extends in a linear direction and is provided with a guide member at a first end portion thereof and said pivoting pin is disposed at a second end thereof, wherein the tape is in rubbing contact with said guide member.

21. An apparatus according to claim 20, wherein said first end portion of said adjusting member contacts said restricting member.

22. An apparatus according to claim 21, wherein said restricting member serves as a base for supporting one of said guiding members.

23. An apparatus according to claim 22, wherein said base is fixed to said first chassis.

24. An apparatus according to claim 18, wherein said pressing means comprises a cam and a lever engaging said cam.

25. An apparatus according to claim 24, wherein said lever has a first end pivotally connected to said first chassis and a second end provided with an elastic member for pressing against said adjusting member.

26. An apparatus according to claim 25, wherein said cam defines a groove on a rotating member, and wherein a projection provided on said lever is engaged in said groove.

* * * * *

UNITED STATES PATENT AND TRADEMARK OFFICE
CERTIFICATE OF CORRECTION

PATENT NO. : 5,363,256
DATED : November 8, 1994
INVENTOR(S) : Kobayashi

It is certified that error appears in the above-indentified patent and that said Letters Patent is hereby corrected as shown below:

COLUMN 4:

Line 3, "p In" should read --In--.

COLUMN 5:

Lines 24-28 should be deleted.
Line 65, "kin," should read --kind,--.
Line 68, "mounted," should read --mount,--.

COLUMN 7:

Line 61, "pin 241" should read --pin 24a--.

COLUMN 11:

Line 39, "thereof." should read --thereof,--.

Signed and Sealed this

Sixth Day of June, 1995

Attest:

BRUCE LEHMAN

Attesting Officer        Commissioner of Patents and Trademarks